(12) United States Patent
Hommrich et al.

(10) Patent No.: US 7,974,908 B1
(45) Date of Patent: Jul. 5, 2011

(54) SYSTEM AND METHOD FOR PROMOTING COMPETITION IN AN AUCTION

(75) Inventors: Thomas P. Hommrich, Pittsburgh, PA (US); Scott A. Casciato, Pittsburgh, PA (US); Michael J. Walker, Pittsburgh, PA (US)

(73) Assignee: Ariba, Inc., Sunnyvale, CA (US)

( * ) Notice: Subject to any disclaimer, the term of this patent is extended or adjusted under 35 U.S.C. 154(b) by 829 days.

(21) Appl. No.: 10/207,231

(22) Filed: Jul. 29, 2002

(51) Int. Cl.
*G06Q 40/00* (2006.01)
(52) U.S. Cl. ......................................................... 705/37
(58) Field of Classification Search ................... 705/37, 705/26, 35
See application file for complete search history.

(56) References Cited

U.S. PATENT DOCUMENTS

| | | | |
|---|---|---|---|
| 3,581,072 A | 5/1971 | Nymeyer | |
| 3,863,060 A | 1/1975 | Rode et al. | |
| 4,597,045 A | 6/1986 | Kiuchi | |
| 4,674,044 A | 6/1987 | Kalmus et al. | |
| 4,789,928 A | 12/1988 | Fujisaki | |
| 4,799,156 A | 1/1989 | Shavit et al. | |
| 4,845,625 A | 7/1989 | Stannard | |
| 4,992,940 A | 2/1991 | Dworkin | |
| 5,136,501 A | 8/1992 | Silverman et al. | |
| 5,193,056 A | 3/1993 | Boes | |
| 5,243,515 A | 9/1993 | Lee | |
| 5,297,032 A | 3/1994 | Trojan et al. | |
| 5,375,055 A | 12/1994 | Togher et al. | |
| 5,394,324 A | 2/1995 | Clearwater | |
| 5,402,336 A | 3/1995 | Spiegelhoff et al. | |
| 5,606,602 A | 2/1997 | Johnson et al. | |
| 5,629,982 A | 5/1997 | Micali | |
| 5,640,569 A | 6/1997 | Miller et al. | |
| 5,664,115 A | 9/1997 | Fraser | |
| 5,684,963 A | 11/1997 | Clement | |
| 5,689,652 A | 11/1997 | Lupien et al. | |
| 5,715,402 A | 2/1998 | Popolo | |
| 5,727,165 A | 3/1998 | Ordish et al. | |
| 5,732,400 A * | 3/1998 | Mandler et al. ................. | 705/26 |

(Continued)

FOREIGN PATENT DOCUMENTS

EP 0399850 A 11/1990

(Continued)

OTHER PUBLICATIONS

Teich, Jeffrey E., Hannele Wallenius, Jyrki Wallenius, Alexander Zaitsev. "Designing Electronic Auctions: An Internet-Based Hybrid Procedure Combining Aspects of Negotiations and Auctions". Electronic Commerce Research. Boston: Jul 2001. vol. 1, Iss. 3; p. 301 (14 pages).*

(Continued)

*Primary Examiner* — Elda Milef
(74) *Attorney, Agent, or Firm* — Van Pelt, Yi & James LLP (57) ABSTRACT

A system and method for promoting competitive bidding in an online auction that has a bidder, a favored bidder, and a sponsor, including receiving bids from the bidder and the favored bidder, deriving a relative spread, determining a market position for the bidder and the favored bidder, and displaying feedback information to at least one of the favored bidder or the bidder. The relative spread represents a minimum premium amount required before the sponsor awards a contract to a non-favored bidder. The market position reflects a comparison of the bid of the favored bidder to the bid of the bidder using the relative spread and the feedback information shows the market position.

22 Claims, 10 Drawing Sheets

U.S. PATENT DOCUMENTS

| | | | |
|---|---|---|---|
| 5,758,327 A | 5/1998 | Gardner et al. | |
| 5,758,328 A | 5/1998 | Giovannoli | |
| 5,765,138 A | 6/1998 | Aycock et al. | |
| 5,774,873 A * | 6/1998 | Berent et al. | 705/26 |
| 5,794,207 A | 8/1998 | Walker et al. | |
| 5,794,219 A | 8/1998 | Brown | |
| 5,797,127 A | 8/1998 | Walker et al. | |
| 5,799,151 A | 8/1998 | Hoffer | |
| 5,799,285 A | 8/1998 | Klingman | |
| 5,802,502 A | 9/1998 | Gell et al. | |
| 5,803,500 A | 9/1998 | Mossberg | |
| 5,809,483 A | 9/1998 | Broka et al. | |
| 5,826,244 A | 10/1998 | Huberman | |
| 5,832,496 A | 11/1998 | Anand et al. | |
| 5,835,896 A | 11/1998 | Fisher et al. | |
| 5,862,223 A | 1/1999 | Walker et al. | |
| 5,890,138 A | 3/1999 | Godin et al. | |
| 5,897,621 A | 4/1999 | Boesch et al. | |
| 5,905,974 A | 5/1999 | Fraser et al. | |
| 5,905,975 A | 5/1999 | Ausubel | |
| 5,915,209 A | 6/1999 | Lawrence | |
| 5,966,699 A | 10/1999 | Zandi | |
| 6,014,627 A | 1/2000 | Togher et al. | |
| 6,021,398 A | 2/2000 | Ausubel | |
| 6,023,685 A | 2/2000 | Brett et al. | |
| 6,044,363 A | 3/2000 | Mori et al. | |
| 6,055,518 A | 4/2000 | Franklin et al. | |
| 6,058,379 A | 5/2000 | Odom et al. | |
| 6,061,663 A | 5/2000 | Bloom et al. | |
| 6,078,906 A | 6/2000 | Huberman | |
| 6,119,229 A | 9/2000 | Martinez et al. | |
| 6,151,589 A | 11/2000 | Aggarwal et al. | |
| 6,161,099 A | 12/2000 | Harrington et al. | |
| 6,199,050 B1 | 3/2001 | Alaia et al. | |
| 6,266,652 B1 | 7/2001 | Godin et al. | |
| 6,366,891 B1 | 4/2002 | Feinberg | |
| 6,647,373 B1 * | 11/2003 | Carlton-Foss | 705/37 |
| 6,647,374 B2 * | 11/2003 | Kansal | 705/37 |
| 6,704,713 B1 * | 3/2004 | Brett | 705/37 |
| 2001/0042041 A1 * | 11/2001 | Moshal et al. | 705/37 |
| 2002/0023039 A1 * | 2/2002 | Fritsch et al. | 705/37 |
| 2003/0009421 A1 * | 1/2003 | Bansal et al. | 705/39 |

FOREIGN PATENT DOCUMENTS

| | | |
|---|---|---|
| JP | 9-101994 | 4/1997 |
| JP | 10-78992 | 3/1998 |
| WO | WO 92/15174 | 9/1992 |
| WO | WO 97/37315 | 10/1997 |
| WO | WO 98/34187 | 8/1998 |
| WO | WO 99/63461 | 12/1999 |

OTHER PUBLICATIONS

Andrews, "Auctions Catch the Interest of Hobbyists and Big Business", Aug. 24, 1998.
Associated Press, "Auction on Web is Buyer's Market", Apr. 6, 1998.
"BroadVision Developing First Interactive Commerce Management System to Support Sales & Marketing Process; New Software Category Necessary to Interactive Network Architecture", Business Wire, p. 5150152, May 15, 1995.
Danny Cohen, "Computerized Commerce", Information Processing 89, Aug. 28-Sep. 1, 1989.
"FairMarket Launches New Self-Serve Auctions", Business Wire, p. 6161495, Jun. 16, 1998.
Jahnke, "How Bazaar", CIO Web Business Magazine, Aug. 27, 1998.
Jean-Pierre Banatre, et al., "The Design and Building of Enchere, a Distributed Electronic Marketing System" Communications of the ACM, No. 1, Jan. 29, 1986.
Lee, "Do electronic marketplaces lower the price of goods?", Communications of the PCM, v41n1 pp. 73-80, Jan. 1998.
Malone, et al., "The Logic of Electronic Markets", Harvard Business Review, No. 893II, May-Jun. 1989.
"Moai Technologies Introduces New categories of Business to Business Auction Software . . . ", Business Editors and Computer Writers, Mar. 16, 1998.
Kikuchi, et al., "Multi-Round Anonymous Auction Protocols", IEICE Trans. Inf. & Syst., vol. E82-D, No. 4, Apr. 1999.
"Online bidding software", Electronic Buyers' News, Issue 1072, p. 86, 1/6p, Aug. 25, 1997.
Sairamesh, et al., "Economic Framework for Pricing and Charging Digital Libraries", D-Lip Magazine, Feb. 1996.
"Sold!. . . To the Lowest Bidder", Computer Finance, v6, n2, Jul. 1995.
"Venture Capitalists Fund Two Massachusetts Internet Related Companies", Boston Globe, Jan. 14, 1998.
Vigoroso, "Buyers prepare for brave new world of e-commerce", Purchasing, v126, n6, p. S4(1), Apr. 22, 1999.
Von der Fehr, et al., "Predatory bidding in sequential auctions", Oxford Economics Papers, v46, n3, p. 345(12), Jul. 1994.
"What you need to know to bid in FCC's narrowband auction", Washington Telecom News, v2, n26, p. 6(2), Jun. 27, 1994.
Wilder, "What's Your Bid?—FreeMarkets' real-time online bidding technology lets clients drive downcosts and improve product value", InformationWeek, Nov. 10, 1997.
Woolley, "E-muscle", Forbes, Mar. 9, 1998.

* cited by examiner

SYSTEM AND METHOD FOR PROMOTING COMPETITION IN AN AUCTION

FIELD OF THE INVENTION

The invention relates generally to conducting online electronic auctions, and in particular, to promoting competitive bidding.

BACKGROUND OF THE INVENTION

It is believed that procurement of goods and services have traditionally involved high transaction costs. The cost of finding and qualifying potential bidders has been particularly high. The advent of electronic commerce has introduced new methods of procurement that lower some of the transaction costs associated with procurement. Electronic procurement, and in particular business-to-business electronic procurement, matches buyers and suppliers and facilitates transactions that take place on networked processors.

In a "forward" auction, there may be multiple buyers competing for the same products and services. As such, bid prices may start low and move upward as each buyer competes until closing. On the other hand, in a supplier-bidding auction, which may also be known as a "reverse" auction, bid prices may start high and move downward as suppliers interact to establish a closing price. This model of auction marketplace is often one-sided, i.e., one buyer and many potential suppliers.

It is believed that, typically, the products being purchased in the auction marketplace are components or materials. "Components" may mean fabricated tangible pieces or parts that become part of assemblies of durable products. Example components include gears, bearings, appliance shelves, or door handles. "Materials" may mean bulk quantities of raw materials that are further transformed into product. Example materials include corn syrup or sheet steel.

Industrial buyers may not want to purchase one component at a time. Rather, they may purchase whole families of similar components. These items may therefore be grouped into a single lot. Suppliers in industrial auctions may provide unit price quotes for all line items in a lot. In theory, a supplier with the lowest bid is awarded with the contract from the buyer.

In many types of business transactions, however, price may not be the sole parameter on which a decision is made. There are, in fact, many reasons that a buyer in an auction may favor and choose one particular supplier over other suppliers. For instance, a buyer may favor a supplier that the buyer had dealt with previously, even if that previous engagement was outside the auction setting. In the negotiations for a supply contract, therefore, a buyer may compare various proposals not only on the basis of price, but also on the basis of the non-price characteristics of non-standard goods, the location of the supplier, the reputation of the supplier, the prior relationship between the supplier and the buyer, etc. It is believed that these non-price "characteristics" typically represent risks to a buyer (a sponsor), of which the sponsor attempts to minimize. In its attempt to minimize these risks, the sponsor may ultimately make an award to a favored bidder, such as an incumbent supplier, over a lower bidding non-favored bidder, such as a non-incumbent bidder.

This may be true even when a lower bidding, non-favored bidder is offering a high quality product or service that is comparable to or superior to that of an incumbent bidder. By awarding a contract to an incumbent supplier over a lower bidding non-favored bidder, it is believed that the sponsor is effectively stating that there was not enough of a price difference between the incumbent supplier and the lower bidding, non-favored bidder to justify the risks associated with bringing on a new supplier.

It is important to note, however, that the sponsor may be willing to award the contract to a lower bidding non-favored bidder if the "spread" between the non-favored bidder and the favored bidder justifies the risks associated with bringing on a new supplier. That is, if a non-favored bidder outbids the favored bidder by at least the amount equal to the spread, it is highly probable that the non-favored bidder be awarded with the contract. The problem is that a non-favored bidder, in general, may not be aware of this information. As a result, favored bidders are frequently re-awarded with contracts and other bidders become frustrated and stop bidding competitively, thereby resulting in a non-competitive bidding process.

Thus, it is believed that there is a need for a system and method of promoting competitive bidding in an auction having a favored bidder. It is believed that there is a further need for a system and method of effectively quantifying the sponsor's risks of switching from a favored bidder to a non-favored bidder. It is believed that there is yet a further need for a system and method for effectively communicating these quantified risks to bidders, who can then use the information to bid more competitively.

SUMMARY OF THE INVENTION

The invention provides a method of promoting competitive bidding in an online auction that has a bidder, a favored bidder, and a sponsor. The method includes receiving bids from the bidder and the favored bidder, deriving a relative spread, determining a market position for the bidder and the favored bidder, and displaying feedback information to at least one of the bidder or the favored bidder. The relative spread represents a minimum premium amount required before the sponsor awards a contract to a non-favored bidder. The market position reflects a comparison of the bid of the favored bidder to the bid of the bidder using the relative spread and the feedback information shows the market position.

The invention provides another method of conducting an online auction having a sponsor and a plurality of bidders that include at least one favored bidder. The method includes receiving bids from the bidders, receiving a reserve price from the sponsor, deriving a relative spread for the sponsor, calculating a dynamic reserve price, determining a market position for each of the bidders, displaying feedback information to at least one of the bidders, updating the market position of the bidders as new bids are received, and selecting a winning bidder from the bidders based on the market position. The reserve price represents a minimum price at which the sponsor is willing to award a contract, the relative spread represents a minimum premium amount required before the sponsor awards the contract to a non-favored bidder, the dynamic reserve price represents a new price at which the sponsor is willing to award the contract to one of the bidders other than the favored bidder, and the market position represents the bid of each bidder with respect to the dynamic reserve price. The feedback information includes the market position.

The invention also provides a graphical user interface that includes a plurality of display regions displayed on a monitor of a computer system used in connection with promoting competitive bidding in an online auction where the online auction has a sponsor and a plurality of bidders and that the bidders include a favored bidder. The display regions include a first display region for displaying a graphical representation of the online auction and a second display region for displaying a textual representation of the online auction. The graphical representation shows a reserve price, a dynamic reserve price and a bid of each of the bidders, where the bid of each of the bidders is shown in relation to the dynamic reserve price. The textual representation shows the bid for each of the bidders in relation to the dynamic reserve price.

The invention also provides a machine readable medium for promoting competitive bidding in an online auction that has a sponsor and a plurality of bidders where the bidders include at least one favored bidder. The machine readable medium includes a first machine readable code that receives bids from the bidders, a second machine readable code that derives a relative spread, a third machine readable code that determines a market position for each of the bidders, a fourth machine readable code that displays feedback information to at least one of the favored bidder or at least one of the bidders. The relative spread represents a minimum premium amount required before the sponsor awards a contract to a non-favored bidder, the market position reflects a comparison of the bids of the bidders other than the favored bidder against a bid of the favored bidder using the relative spread, and the feedback information shows the market position.

The invention also provides a system for promoting competitive bidding in an online auction having a sponsor and a plurality of bidders that includes at least one favored bidder. The system includes at least one processor that receives bids from the bidders, derives a relative spread, determines a market position for each of the bidders, displays feedback information to at least one of the favored bidder or at least one of the bidders, updates the market position based on new bids from the bidders, and selects a winning bidder from the bidders based on the market position. The relative spread represents a minimum premium amount required before the sponsor awards a contract to a non-favored bidder. The market position reflects a comparison of the bids of the bidders other than the favored bidder against a bid of the favored bidder using the relative spread. The feedback information shows the market position.

The invention further provides a computer system operatively connected to a network for facilitating a bidder to participate competitively against a favored bidder in an online auction. The system includes means for receiving a bid from the bidder and a bid from the favored bidder over the network, means for deriving a relative spread, means for determining a market position of the bidder in relation to the favored bidder using the relative spread, and means for transmitting feedback information. The relative spread represents a minimum premium amount required before the sponsor awards a contract to a non-favored bidder and the feedback information includes the market position and at least one of a textual representation or a graphical representation.

BRIEF DESCRIPTION OF THE DRAWINGS

The accompanying drawings, which are incorporated herein and constitute a part of this specification, illustrate the presently preferred embodiments of the invention and, together with the general description given above and the detailed description given below, serve to explain the features of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical auction systems and computer networks.

The present invention described below extends the operation of the inventive auction systems and methods described in greater detail in co-pending application Ser. No. 09/490,877, entitled "Method and System for Partial Quantity Evaluated Rank Bidding in Online Auctions" filed Jan. 24, 2000, and co-pending application Ser. No. 09/710,097, entitled "Method, Apparatus and System for Providing Variable Market Information Disclosure in an Auction" filed, Nov. 10, 2000, the disclosures of which are hereby expressly incorporated by reference.

The invention provides a system and method of promoting competitive bidding in an auction having a plurality of bidders, including at least one favored bidder. The system and method is particularly applicable to online auctions where bidders submit bids electronically for supply contracts to an auction coordinator during the auction process.

The following description of the features of the present invention is presented in the context of downward-based online industrial auctions. However, as would be appreciated by one of ordinary skill in the relevant art, these inventive features could also be applied in the context of upward-based online auctions as well.

Figure 1A:
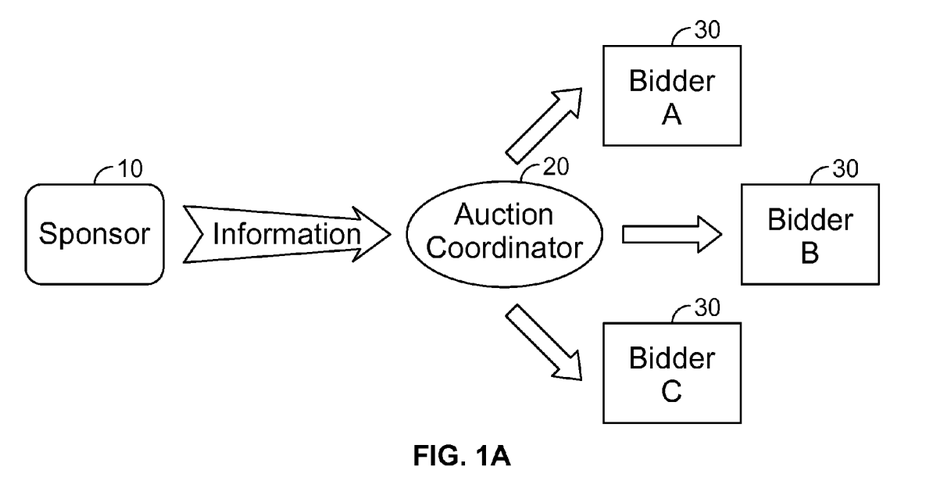
FIG. 1A is a flow diagram of a request for quotation in an auction.
Figure 1B:
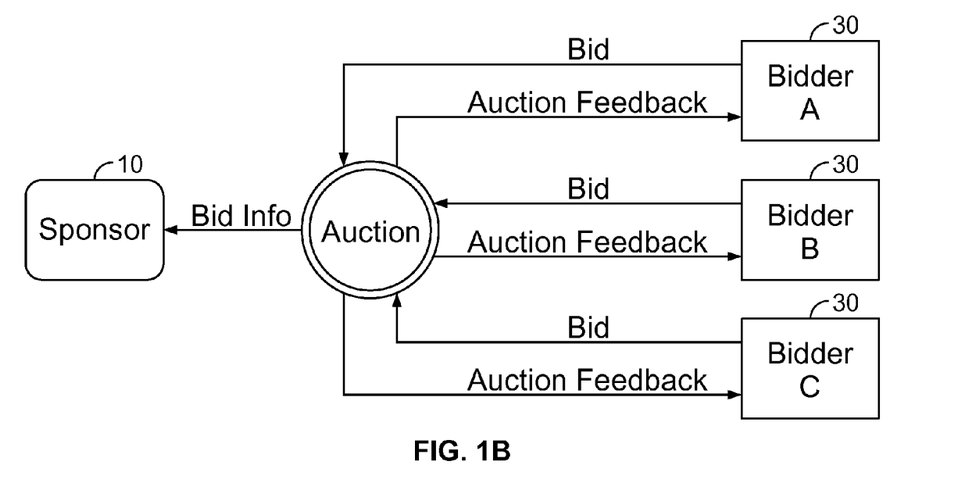
FIG. 1B is a flow diagram of a bidding process in an auction.
Figure 1C:
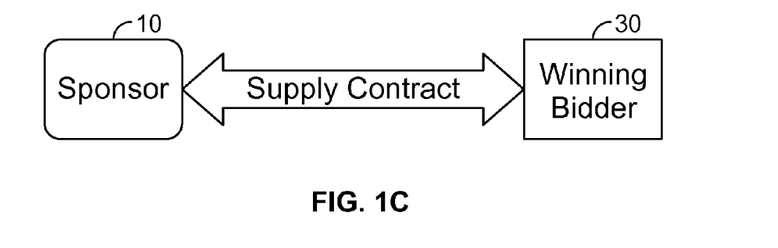
FIG. 1C is a flow diagram of a contract award following an auction.

The basic process for a purchaser sponsored supplier-bidding or reverse auction, as conducted by the assignee of the present invention, is described below with reference to FIGS. 1A-1C. FIGS. 1A-1C illustrate the functional elements and entities involved in setting up and conducting a typical supplier-bidding auction. FIG. 1A illustrates the creation of an auctioning event, FIG. 1B illustrates the bidding during an auction, and FIG. 1C illustrates results after completion of a successful auction.

In the supplier-bidding reverse auction model, the product or service to be purchased is, preferably, defined by the buyer or sponsor 10 of the auction, as shown in FIG. 1A. Alternatively, the sponsor may set up all or some of its own bidding events and find its own suppliers. In that case, the sponsor 10 would run the events through a market operations center, which is a facility where auctions are monitored and participants receive assistance. If the sponsor 10 decides to use the auctioning system of the present invention to procure products or services, the sponsor 10 may provide information to an auction coordinator 20. That information may include, for example, information about incumbent suppliers and historic prices paid for the products or services to be auctioned. Preferably, the sponsor 10 also works with the auction coordinator 20 to define the products and services to be purchased in the auction and lot the products and services appropriately so that desired products and services can be procured using optimal auction dynamics. A specification may then be prepared for each desired product or service, and a Request for Quotation ("RFQ") may be generated for the auction.

Next, the auction coordinator 20 may identify potential suppliers, or bidders 30, preferably, with input from the sponsor 10, and invite the potential suppliers 30 to participate in the upcoming auction. The suppliers 30 that are selected to participate in the auction may become bidders 30 and may be given access to the RFQ, typically through an RFQ in a tangible form, such as on paper or in an electronic format.

As shown in FIG. 1B, during a typical auction, bids are made for lots. Bidders 30 may submit actual unit prices for all line items within a lot, however, the competition in an auction is typically based on the aggregate value bid for all line items within a lot. The aggregate value bid for a lot may, therefore, depend on the level and mix of line item bids and the quantity of goods or services that are offered for each line item. Thus, bidders 30 submitting bids at the line item level may actually be competing on the lot level. During the auction, the sponsor 10 may typically monitor the bidding as it occurs. As discussed further below, in accordance with the present invention, bidders 30 may also be given market feedback during the auction so that they may bid competitively.

After the auction, the auction coordinator 20 may analyze the auction results with the sponsor 10. The sponsor 10 may conduct final qualification of the low bidding supplier or suppliers 30. The sponsor 10 may furthermore retain the right not to award business to a low bidding supplier 30 based on final qualification or other business concerns. As shown in FIG. 1C, a supply contract may be drawn up for the winning bidder 30 and executed based on the results of the auction.

The auction may be conducted electronically between bidders 30 at their respective remote sites and the auction coordinator 20 at its site. Alternatively, instead of the auction coordinator 20 managing the auction at its site, the sponsor 10 may perform auction coordinator tasks at its site.

Figure 2:
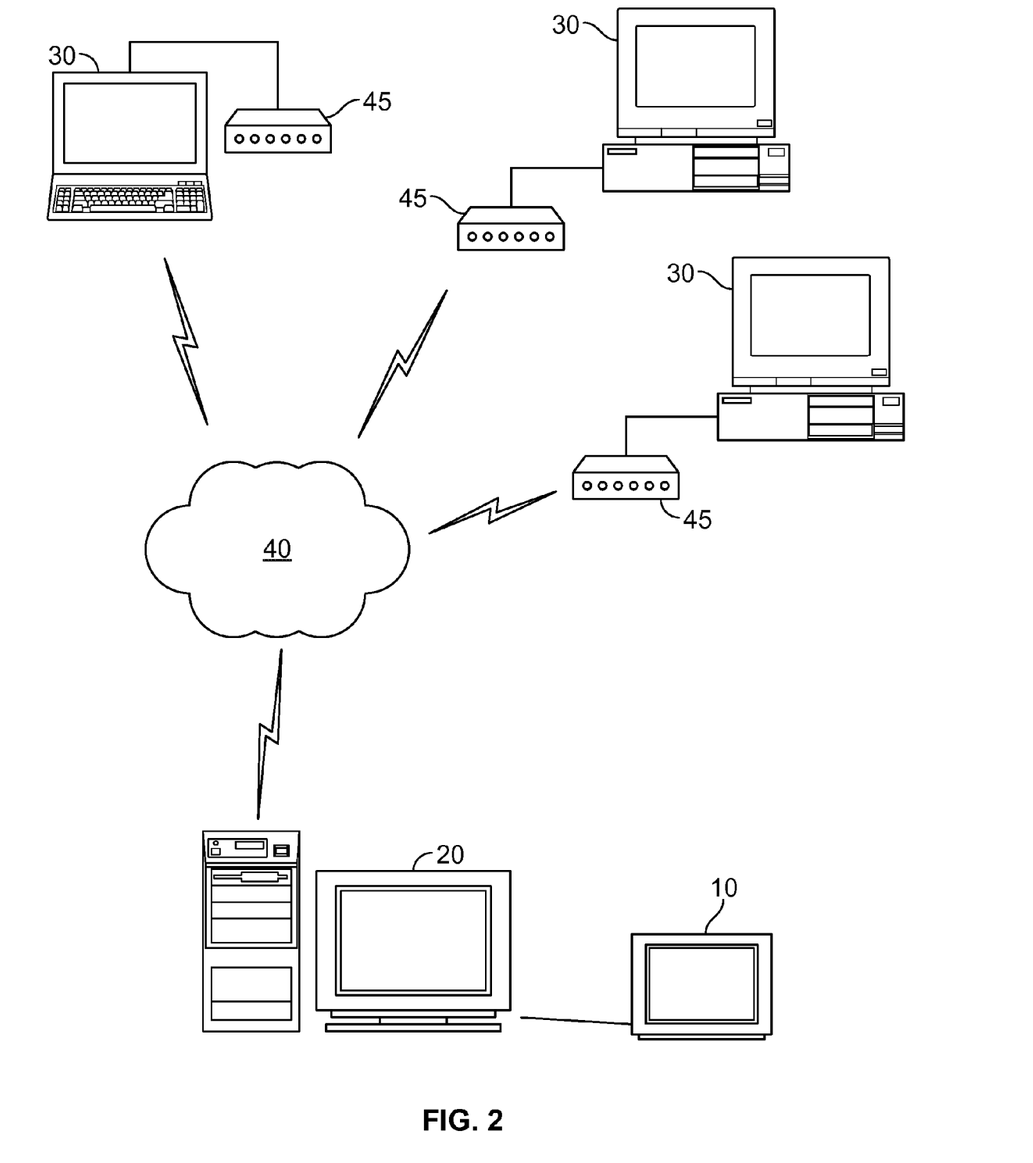
FIG. 2 is a schematic illustration of communications links between the coordinator, the sponsor, and the bidders in an auction.

Information may be conveyed between the coordinator 20 and the bidders 30 via any communications medium. As shown in FIG. 2, using a computer system, bidders 30 may be connected to the auction via a global network environment, such as the Internet 40. For example, using a computer system coupled to a modem 45, bidders 30 may connect to the auction via an existing dial-up telephone line. Alternatively, sponsors 10 and bidders 30 may be coupled to the auction by communicating directly with the auction coordinator 20 through a public switched telephone network, a wireless network, or any other connection.

Figure 3:
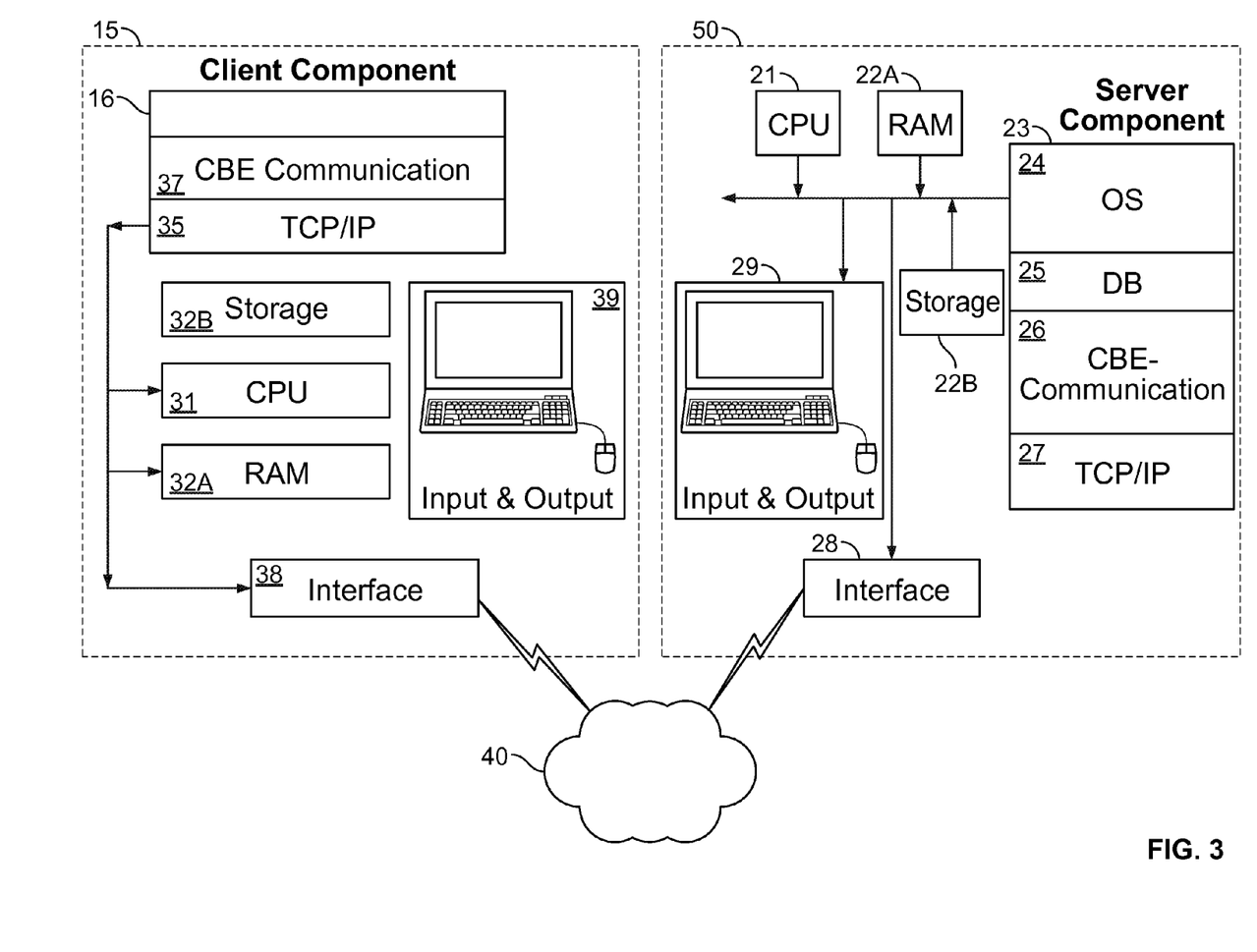
FIG. 3 is a schematic illustration of auction software and computers hosting that software in an auction.

In accordance with the present invention, a computer software application may be used to manage the auction. Preferably, as shown in FIG. 3, the computer software application has two computer systems 15 and 50, each having its own component: a client component 16 and a server component 23, respectively. The client component 16 may operate on a computer at the site of each of the bidders 30. Bidders 30 make bids during the auction using the client component 16. The bids may be sent via the global network 40 to the site of the coordinator 20, where it is received by the server component 23 of the software application. The client component 16 may include software used to make a connection through telephone lines or the Internet to the server component 23. Bids may be submitted over this connection and updates may be sent to the connected suppliers.

In one embodiment of the present invention, bids may only be submitted using the client component 16 of the application. This ensures that buyers do not circumvent the bidding process and that only invited suppliers participate in the bidding. In accordance with the present invention, bidders 30 may see their bids and bids placed by other suppliers for each lot on the client component 16. When a bidder 30 submits a bid, that bid is sent to the server component 23 and evaluated to determine whether the bid is from an authorized bidder and whether the bid has exceeded a predetermined maximum acceptable price. As discussed further below, bids placed by a supplier may be broadcast to all connected bidders, thereby enabling every participating bidder to quickly view the change in market conditions and begin planning their competitive responses.

The embodiments of the invention may be implemented by a processor-based computer system 50. The system 50 includes a database 25 for receiving and storing bid information from bidders and software for, among other things, determining or updating market positions of the bidders 30 and displaying feedback information. As shown further in FIG. 3, in accordance with the present invention, computer system 50 operates to execute the functionality for server component 23. Computer system 50 includes a processor 21, a memory 22A and a disk storage 22B. Memory 22A stores computer program instructions and data. Processor 21 executes the program instructions or software, and processes the data stored in memory 22A. Disk storage 22B stores data to be transferred to and from memory 22A. Note that disk storage 22B can be used to store data that is typically stored in database 25.

All these elements are interconnected by one or more buses, which allow data to be intercommunicated between the elements. Note that memory 22A is accessible by processor 21 over a bus and includes an operating system, a program partition and a data partition. The program partition stores and allows execution by processor 21 of program instructions that implement the functions of each respective system described herein. The data partition is accessible by processor 21 and stores data used during the execution of program instructions.

For purposes of this application, memory 22A and disk 22B are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, lightwave signals, radio-frequency (RF) signals and any other device or signal that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, system 50 may contain various combinations of machine readable storage devices, which are accessible by processor 21 and which are capable of storing a combination of computer program instructions and data.

Computer system 50 also includes a network interface 28. Network interface 28 may be any suitable means for controlling communication signals between network devices using a desired set of communications protocols, services and operating procedures. Communication protocols are layered, which is also referred to as a protocol stack, as represented by operating system 24, a CBE-communication layer 26, and a Transport Control Protocol/Internet Protocol (TCP/IP) layer 27. Network interface 28 also includes connectors for connecting interface 28 with a suitable communications medium. Those skilled in the art will understand that network interface 28 may receive communication signals over any suitable medium such as twisted-pair wire, co-axial cable, fiber optics, radio-frequencies, and so forth.

FIG. 3 further shows another computer system 15 that operates to execute the functionality for client component 16. Computer system 15 includes a processor 31, a memory 32A, disk storage 32B, a network interface 38, and a protocol stack having a CBE-communication layer 37 and a TCP/IP layer 35. These elements operate in a manner similar to the corresponding elements for computer system 50.

Computer systems 15 and 50 are used by a bidder 30 and auctioneer 20 or sponsor 10, respectively, to conduct an online auction over a global network 40. Referring again to the basic procurement process for a purchaser sponsored supplier-bidding or reverse auction, as referenced in FIGS. 1A-1C, when the auction concludes, the lowest bidding bidder generally becomes the winning bidder. This is especially true when there are no favored bidders, such as an incumbent supplier, participating in an auction. In that event, the only threshold to becoming a winning bidder would be to "beat" a reserve price, which represents a minimum price at which the sponsor is willing to award a contract. As noted earlier, however, this may not always be the case when a favored bidder is bidding competitively in the same auction. When an auction involves at least one favored bidder, the effect of reserve price becomes far more complicated and the practical application of the reserve price is not straightforward. This is due primarily to the risks associated with bringing on a new supplier. The following example illustrates this point.

TABLE 1

Exemplary list of potential suppliers and their lowest bid prices.

| SUPPLIER | BIDDING PRICE (per unit) |
|---|---|
| Bidder A | $1.55/unit |
| Bidder B (incumbent supplier) | $1.52/unit |
| Bidder C | $1.48/unit |

In the example shown above in Table 1, at the closing of the auction, Bidder C is the market leading bidder with the lowest bid at $1.48 per unit. Nevertheless, Bidder C may not be awarded with the contract in this scenario. Rather, the sponsor may select Bidder B over Bidder C, even though Bidder C outbid Bidder B by $0.04 per unit. It should be noted that in this example, Bidder B is an incumbent supplier who has dealt with the buyer previously. By selecting Bidder B, the sponsor is implicitly stating that the current spread (i.e., $0.04 per unit) is not enough to take on a new supplier and face the risks of associating with a new supplier. Although it frustrates Bidder C, the decision is very rational and can be justified in that it strikes a balance between savings and caution.

Further assume in the above example that a reserve price of $1.60 per unit had been known to bidders. As noted, the reserve price represents a minimum price at which the sponsor 10 is willing to award a contract. Under that scenario, Bidder C could be even more frustrated by the sponsor 10's decision to award the contract to Bidder B. Obviously, Bidder C may feel that since it surpassed the reserve price by $0.12 (or $1.60 less $1.48) and that it was the lowest bidding bidder, it deserved to win the contract. Although it was rational, the sponsor 10's decision may deter Bidder C and other non-incumbent bidders from bidding competitively.

It is apparent from the example illustrated above that the reserve price, alone in itself, may not represent the true threshold to winning the contract in certain situations. As a matter of fact, in the above example, the reserve price loses its significance as soon as an incumbent bidder places a bid below the reserve price. Accordingly, a more important factor in the above example is a relative or minimum spread, which is the amount that the sponsor 10 requires before contemplating switching from an incumbent supplier to a new supplier. Indeed, to entice a sponsor 10 to switch from an incumbent supplier to a new supplier and bear the risks of receiving products and/or services with unknown quality, the sponsor 10 should be compensated with an appropriate risk premium. This risk premium is quantified as the relative or minimum spread. In the above example, for instance, if Bidder C knew in advance the amount of the spread, Bidder C could have been bidding more competitively, thereby increasing the chance of winning the contract. Using the inventive method and system of the present invention, the problem of "favoring" favored bidders is addressed.

Note that while, in the example shown above in Table 1, the favored bidder (i.e., Bidder B) was an incumbent supplier, a favored bidder, in accordance with the present invention, need not be an incumbent supplier. As noted earlier, there are many reasons that a buyer in an auction may favor and choose one particular supplier over other suppliers. For instance, a buyer may favor a supplier that the buyer had dealt with previously, even if that previous engagement was outside the auction setting. Likewise, a buyer may favor a supplier based on any one of non-price related reasons, e.g., a good reputation of the supplier. It should be apparent that, therefore, the present invention encompasses the term "favored bidder" to include any bidder that is favored, regardless of the reasons.

Figure 4:
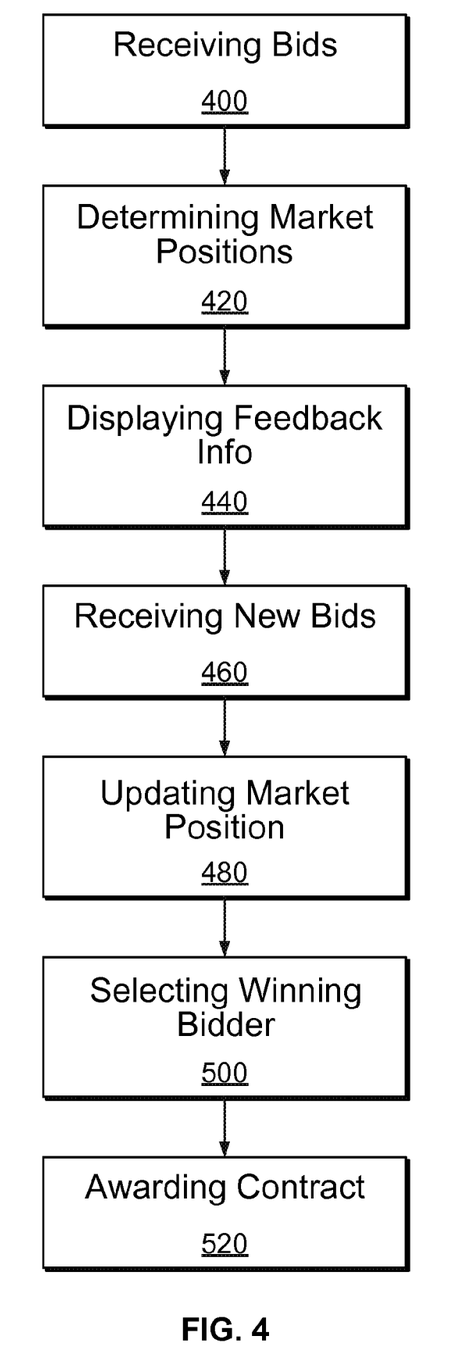
FIG. 4 is a block flow diagram of an embodiment of the method of the invention.

In the preferred embodiment, as shown in FIG. 4, a method of promoting competitive bidding in an online auction having at least one favored, or incumbent, bidder is provided. In step 400, bids are received from bidders 30. As noted earlier, each bidder 30 may bid on one or more lots, depending on what and how many lots are available. Using the bids received, each bidder 30's current market position is determined in step 420. The market position reflects a bidder 30's relative strength of its bid in comparison to other pertinent data, such as an incumbent bidder's bid, reserve price, or relative spread required by the sponsor 10. Once determined, the market position is included in feedback information, which is displayed to one or more selected bidders in step 440. The feedback information shows data relating to the market position and any other pertinent information. As discussed further below, the feedback information presents selected bidders with adequate information to make an informed decision in regard to bidding. Using the information contained in the feedback information, the selected bidders may wish to submit new bids in step 460. Using the new bids received, the market position is updated in step 480. The same methodology is used here as in step 420. The only difference is that the old bids are replaced with the any new bids. After the market position is updated, a winning bidder is selected in step 500. The winning bidder 30 could be an incumbent bidder or non-incumbent bidder, depending on the market position. The sponsor 10 may wish to award a contract to the winning bidder 30 in step 520.

Figure 5:
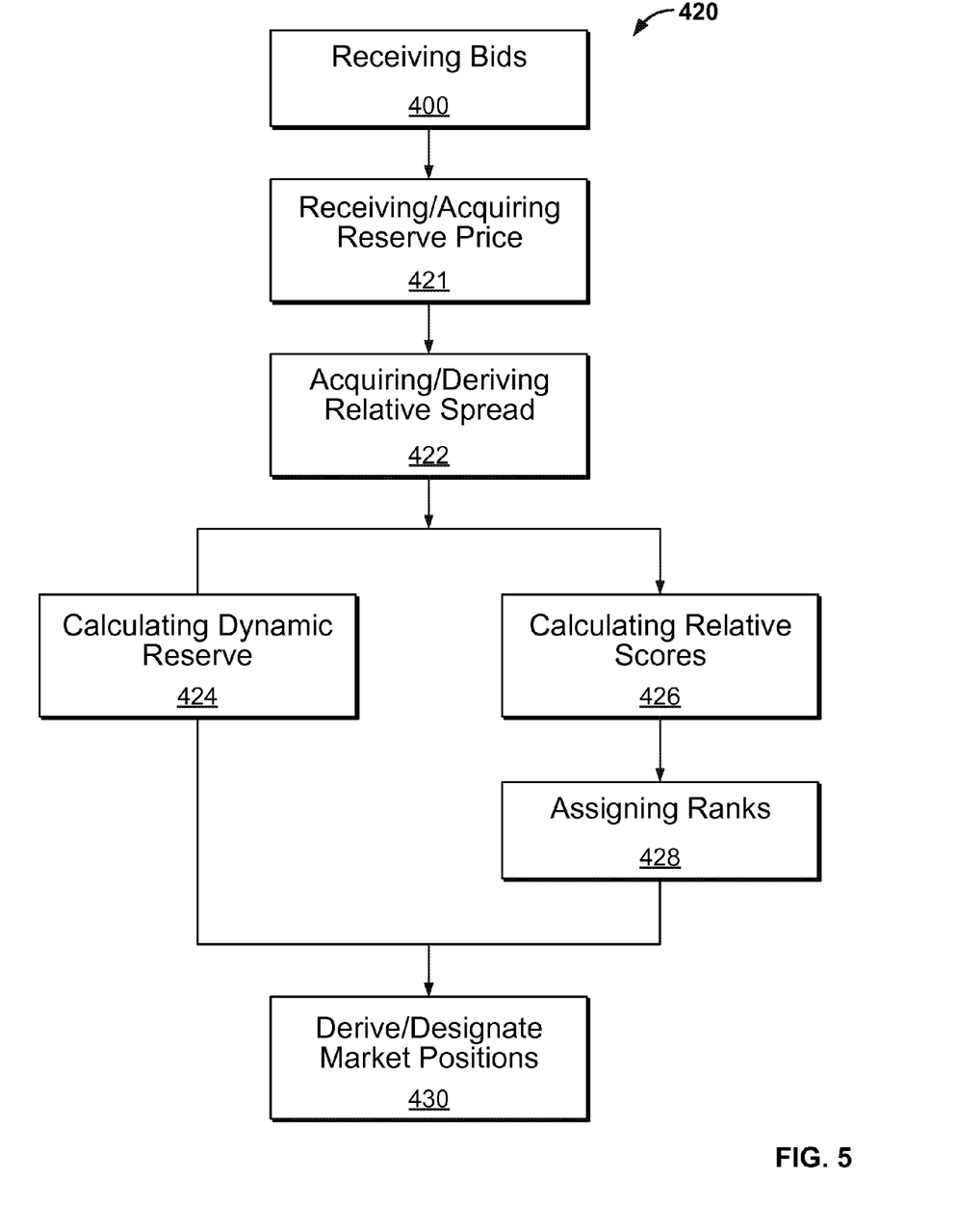
FIG. 5 is a flow diagram of the "DETERMINING MARKET POSITION" step of FIG. 4 in greater detail.

In FIG. 5, step 420 of FIG. 4 is explained in greater detail. After receiving bids from bidders 30 in step 400, a reserve price is received or acquired from the sponsor in step 421. The reserve price (or original reserve price) represents a minimum price at which the sponsor 10 is willing to award a contract. That is, if none of the bids meets or surpasses the reserve price, the sponsor may wish to forbear from awarding a contract to anyone. The reserve price may be automatically derived for the sponsor 10. For instance, a reserve price may be automatically set to equal the historic price for that particular sponsor 10. Next, a relative spread is acquired/derived in step 422. As noted earlier, a relative spread represents a minimum spread or the amount of premium that the sponsor 10 requires before switching from an incumbent supplier to a new supplier. The relative or minimum spread may be expressed as a fixed or variable value, such as a predetermined amount or a percentage of a certain bid price. For instance, a relative or minimum spread could be equal to $0.15 per unit below the bid of an incumbent bidder. Alternatively, it may be expressed as at least 3% less than the incumbent.

In one embodiment, a relative or minimum spread is given by the sponsor 10. That is, the sponsor 10 may actively quantify its own risk premium of switching from an incumbent to a new supplier. In another embodiment, a relative or minimum spread is automatically formulated for the sponsor 10 by system 50. Using its own historical data stored in database 25, computer system 50 formulates the relative spread for a given sponsor 10 automatically. For instance, if a given sponsor 10 has, in the past, switched from the incumbent to a new supplier for a particular type of product at a given spread, computer system 50 uses the same spread for similar types of products for that sponsor 10.

In yet another embodiment, a relative or minimum spread is derived using industry figures. For instance, database 25 may store all current industry information, including, among other things, a current risk premium. The current risk premium may be based on a particular industry or particular products, or the premium may be specifically tailored to a particular supplier, if available. Using the information stored in database 25, computer system 50 may predict or forecast a relative spread for a given sponsor 10.

Once the relative spread is acquired/derived in step 422, in one embodiment, two subsequent steps 424 and 426 take place simultaneously. It should be noted that steps 424 and 426 are independent from one another and need not be performed simultaneously. In step 424, a dynamic reserve price is calculated. As will be discussed further below, a dynamic reserve price represents a new reserve price at which the sponsor 10 may be willing to award the contract to a bidder other than to an incumbent bidder. That is, in an auction having an incumbent bidder, a non-incumbent bidder should beat or surpass the dynamic reserve price to have a realistic chance of being awarded a contract.

Alternatively or additionally in step 426, as discussed further below, a relative score is calculated for each bidder 30. This score is used to assign ranks to each bidder 30 in step 428. The ranking process is designed to provide real-time display to bidders 30 of their weighted position in the bidding process relative to the incumbent. That is, using its respective rank, a particular bidder may learn how well it stacks up against the incumbent bidder in a given auction. Using a dynamic reserve from step 424 and/or ranks in steps 426 and 428, a market position is derived/designated in step 430. The market position may contain a bidder's bid relative to the dynamic reserve. The market position may also contain the bidder's rank relative to the ranks of other bidders.

Figure 6:
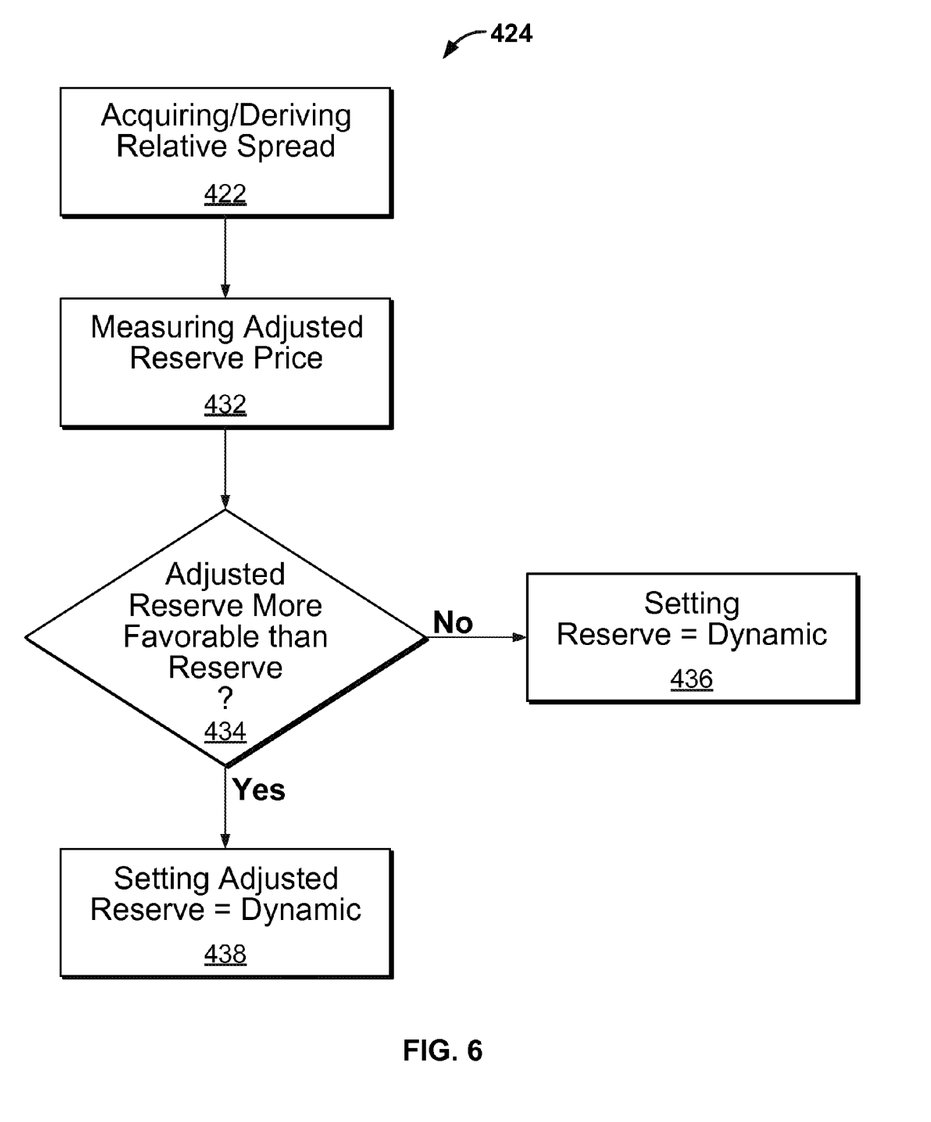
FIG. 6 is a flow diagram of the "CALCULATING DYNAMIC RESERVE" step of FIG. 5 in greater detail.

In FIG. 6, step 424 of FIG. 5 is explained in greater detail. After acquiring/deriving a relative spread for the sponsor 10 in step 422, an adjusted reserve price is measured in step 432. An adjusted reserve price is generally equal to the lowest bid of the incumbent bidder multiplied (or otherwise adjusted) by a factor of the relative spread. That is, the adjusted reserve price represents the lowest bid of the incumbent bidder, adjusted by the cost of switching or a risk premium. A non-incumbent bidder must beat or surpass this amount before being seriously considered for an award of the contract. As noted earlier, a reserve price represents a minimum price at which the sponsor 10 is willing to award a contract to anyone, including the incumbent. As such, in step 434, the reserve price is compared to the adjusted reserve price. If the reserve price is more favorable to the sponsor 10 than the adjusted reserve price, then any bidder 30, including an incumbent bidder, must meet or surpass this price to be considered for an award of the contract. If, on the other hand, the adjusted reserve price is more favorable to the sponsor 10 than the reserve price, then a non-incumbent bidder must meet or surpass this price for an award of the contract. Of course, the incumbent bidder, in this scenario, need not meet or surpass this price (i.e., adjusted reserve price). Accordingly, in step 438, if the adjusted reserve price is more favorable than the reserve price, then the adjusted reserve price becomes the dynamic reserve price. If the adjusted reserve price is not more favorable than the reserve price, then the reserve price becomes the dynamic reserve price, as in step 436.

Figure 7A:
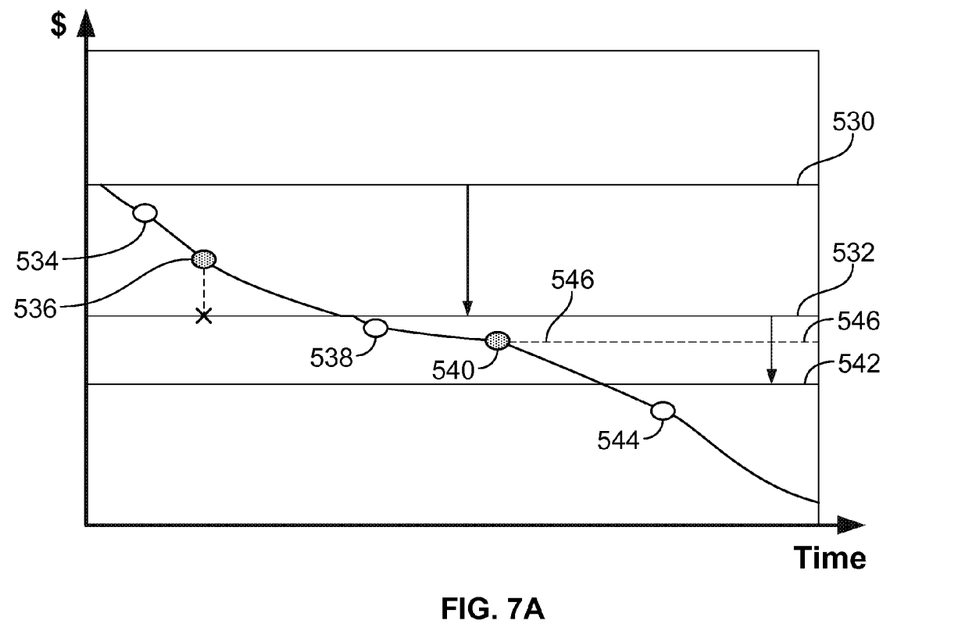
FIG. 7A is a graph illustrating original and dynamic reserves in a sample auction.
Figure 7B:
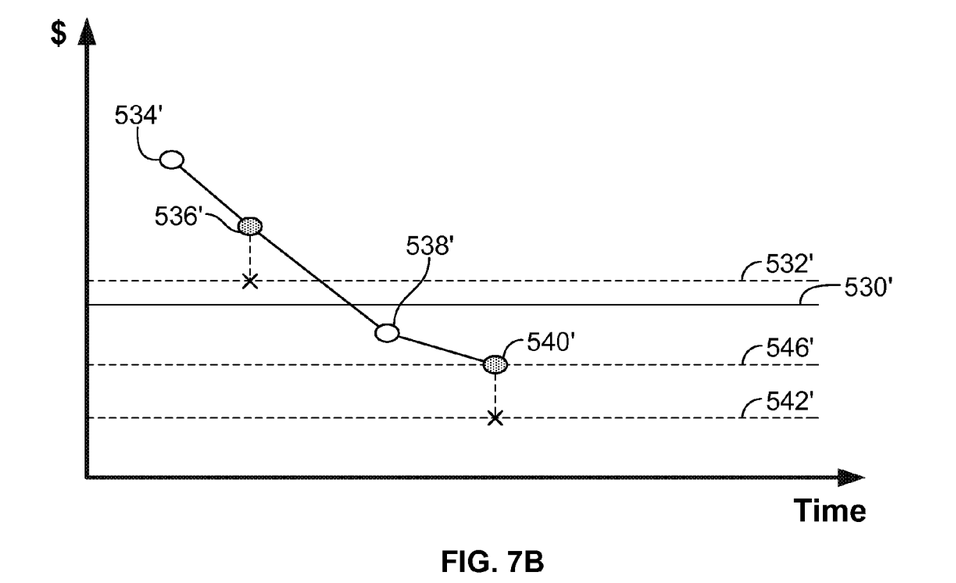
FIG. 7B is another graph illustrating original and dynamic reserves in a sample auction.

This interaction among reserve price, adjusted reserve price, dynamic reserve price, and bids is shown graphically in FIGS. 7A and 7B. In FIG. 7A, a non-incumbent bidder places a first bid 534 below the reserve price at line 530. If the auction had closed at this point, the first bid 534 would likely be the winning bid. However, moments later, an incumbent bidder places its first bid 536, which is lower than the first bid 534 of the non-incumbent bidder. As a result, the reserve price at line 530 becomes irrelevant and adjusted reserve line 532 is placed below the first bid 536 of the incumbent bidder. Here, the difference between the first bid 536 of the incumbent bidder and the adjusted reserve at line 532 is the relative spread or minimum spread. In this situation, a non-incumbent bidder would not be a winning bidder, unless the non-incumbent bidder bids below the adjusted reserve at line 532. It is important to note that, in this scenario, the dynamic reserve price was initially set to equal the original reserve price of line 530. However, the dynamic reserve price is now equal to the adjusted reserve price at line 532, since it is more favorable to the sponsor 10 than the original reserve at line 530. Note further that, when the non-incumbent bidder places its second bid 538 below the adjusted reserve at line 532, the non-incumbent bidder is the current winning bidder. Here, the non-incumbent bidder has surpassed the adjusted reserve at line 532, thereby also surpassing the dynamic reserve price, which is equal to the adjusted reserve at line 532. However, when the incumbent bidder places its second bid 540, the adjusted reserve line again shifts to line 542, which is again equal to the dynamic reserve price, since the adjusted reserve line is still more favorable than the original reserve at line 530. Now, a non-incumbent bidder must meet or surpass the dynamic price level indicated by the adjusted reserve at line 542 to become a winning bidder. By placing the third bid 544 below line 542, the non-incumbent bidder is once again the leading bidder and may win the contract.

In FIG. 7B, the original reserve price is placed at line 530'. A non-incumbent bidder places its first bid 534' followed by an incumbent bidder's first bid 536'. Note that both bids 534' and 536' are placed above the reserve price at line 530'. In this scenario, the adjusted reserve line 532' is placed above the reserve price at line 530'. The adjusted reserve line is again derived by taking the first bid 536' of the incumbent bidder and applying the relative spread or minimum spread. It is important to note that since the reserve price at line 530' is placed below the adjusted reserve at line 532', it is more favorable to the sponsor 10, and therefore becomes the dynamic reserve price. This means that either a non-incumbent bidder or incumbent bidder now must bid below the dynamic reserve price, which is equal to the original reserve price line 530', in order to become a winning bidder. By placing its second bid 538' below the dynamic price at line 530', the non-incumbent bidder is the winning bidder. Note, however, that when the incumbent bidder places its second bid 540' below the second bid 538' of the non-incumbent bidder, the dynamic price shifts to line 542'. A non-incumbent bidder must now meet or surpass line 542', which represents a new dynamic reserve, in order to become the winning bidder. For an incumbent bidder, the threshold to winning the contract remains at line 530', which is the original reserve, assuming that no non-incumbent bidder has placed a bid below line 542' (or otherwise has surpassed the dynamic reserve price).

In another embodiment of the present invention, a dynamic price may be equal to the lowest bid of the incumbent bidder. As shown further in FIGS. 7A and 7B, the dynamic price may be revised to equal the incumbent's latest market bid after the incumbent bids below the original reserve price. If the incumbent's latest market bid is above the original reserve price, the dynamic reserve price remains at the original reserve price. This dynamic reserve (i.e., the incumbent's latest market bid after the incumbent bids below the original reserve price) is indicated by line 546 in FIG. 7A, and line 546' in FIG. 7B. This indicates that the sponsor 10 is willing to entertain any leading bids, whether from an incumbent or non-incumbent bidder, as long as the bids are below the original reserve price.

Figure 8:
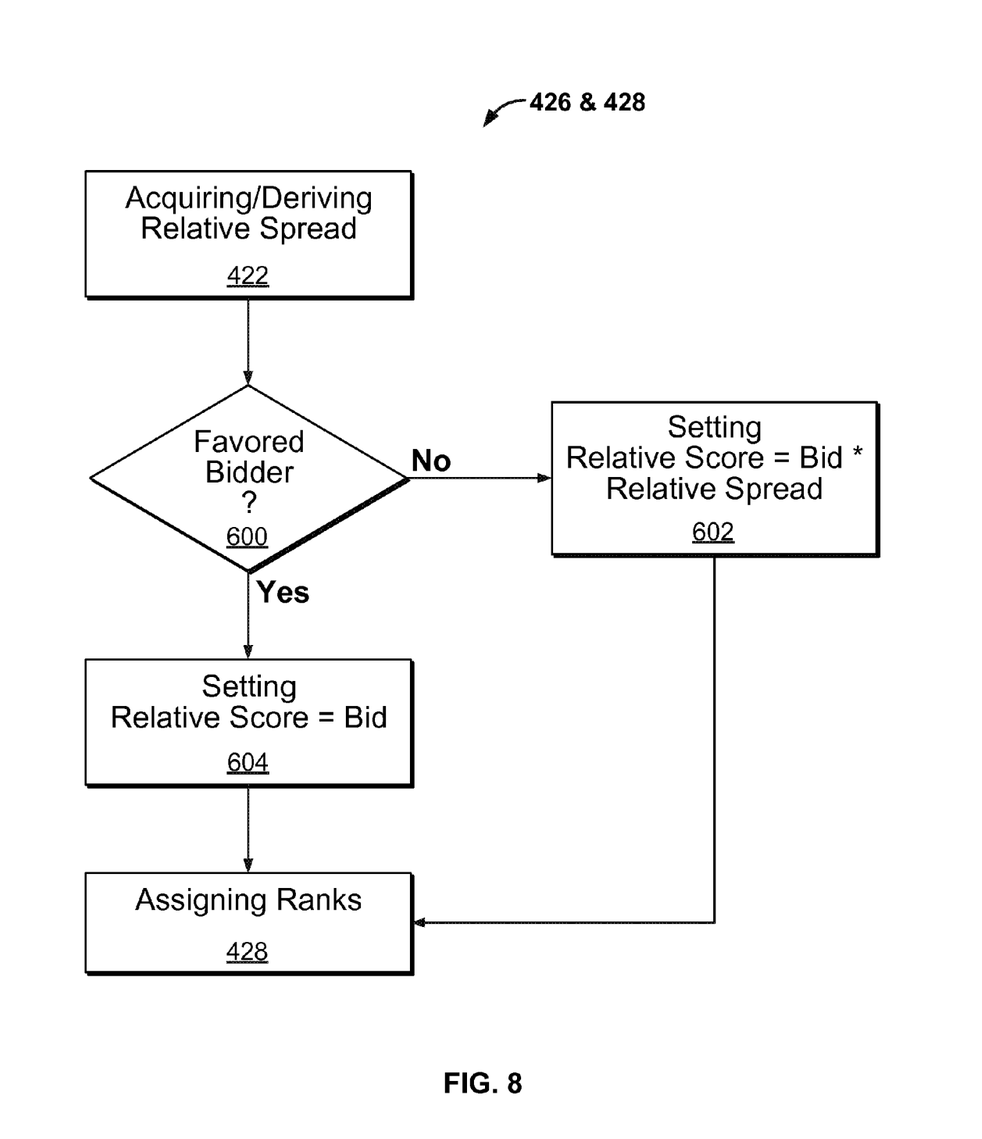
FIG. 8 is a flow diagram of the "CALCULATING RELATIVE SCORE" and "ASSIGNING RANKS" steps of FIG. 5 in greater detail.

In one embodiment of the present invention, a market position of each bidder 30 includes a respective ranking relative to other bidders and to an incumbent, or favored, bidder. As shown in FIG. 8, which shows steps 426 and 428 of FIG. 5 in greater detail, the process of assigning ranks begins by acquiring/deriving relative spread in step 422. Note that relative scores represent weighted scores based on bids of the bidders 30. In step 600, a bidder status is determined. This is necessary, because calculations for the relative scores differ based on the bidder status. For an incumbent bidder, for instance, its bid amount becomes its relative score, as shown in step 604. For a non-incumbent bidder, the relative score is calculated, as shown in step 602, by taking its bid and multiplying by the relative or minimum spread, which is acquired/derived in step 422. This formula can be expressed in the following expression.

$$(x)*(y)=z, \qquad 1.$$

where
x is the relative spread (or risk premium), expressed in percentage or fraction;
y is the best bid of the non-incumbent supplier; and
z is the best bid of the incumbent.

By definition of the formula stated above, $1.(x)*(y)$ must be less than z in order for a new supplier to take a market lead in front of an incumbent. This formula can be applied to the exemplary auction shown in Table 1, where the bid is based on per unit pricing and where the result is a best bid offer by an incumbent (i.e., Bidder B) of $1.52 per unit and a best bid offer by a new supplier (i.e., Bidder C) of $1.48. In that example, if x is equal to 0.03, or 3% of the new bidder bid, then the incumbent bid of $1.52 would be less than the new bidder bid of $1.48 times 1.03 or $1.5244. Thus, the incumbent bidder would receive an award in that auction when the relative or minimum spread (x) is equal to 0.03. Alternately, if x is equal to 0.02, or 2% of the new bidder bid, then the incumbent bid of $1.52 would be greater than then new bidder bid of $1.48 times 1.02 or $1.5096. Thus, the new bidder would receive an award in that auction when the relative spread (x) is equal to 0.02. This result is shown in Table 2 below. Note that there are two scenarios (i.e., (1) and (2)), one for x=0.03 and the other for x=0.02.

TABLE 2

Exemplary list of potential suppliers and their rankings.

| SUPPLIER | Bidding Price (y) | Relative (or minimum) Spread (x) | | Relative (or weighted) score = $1.(x)*(y)$ | | Rank | |
|---|---|---|---|---|---|---|---|
| | | (1) | (2) | (1) | (2) | (1) | (2) |
| Bidder A | $1.55/unit | 0.03 | 0.02 | $1.566 | $1.550 | 3 | 3 |
| Bidder B (incumbent supplier) | $1.52/unit (z) | N/A | N/A | $1.52 | $1.52 | 1 | 2 |
| Bidder C | $1.48/unit | 0.03 | 0.02 | $1.524 | $1.509 | 2 | 1 |

Referring again to FIG. 8, after the relative score is calculated in steps 602 and 604, ranks are assigned in step 428. Ranks are assigned by comparing all relative scores. Thus, in the first scenario of the example above, Bidder B is assigned rank number one since it has the lowest bid at $1.52 per unit. Alternatively, in the second scenario, Bidder C is assigned rank number one since it now has the lowest bid at $1.509 per unit.

It should be noted that the ranking process is not limited to weighing in bids as the only factor; rather, it could weigh in other factors such as the financial stability of a particular supplier, the location of the supplier, the reputation of the supplier, etc. This and other methods of selectively ranking bidders using different criteria will be apparent to those skilled in the art and are within the scope of the present invention.

Figure 9:
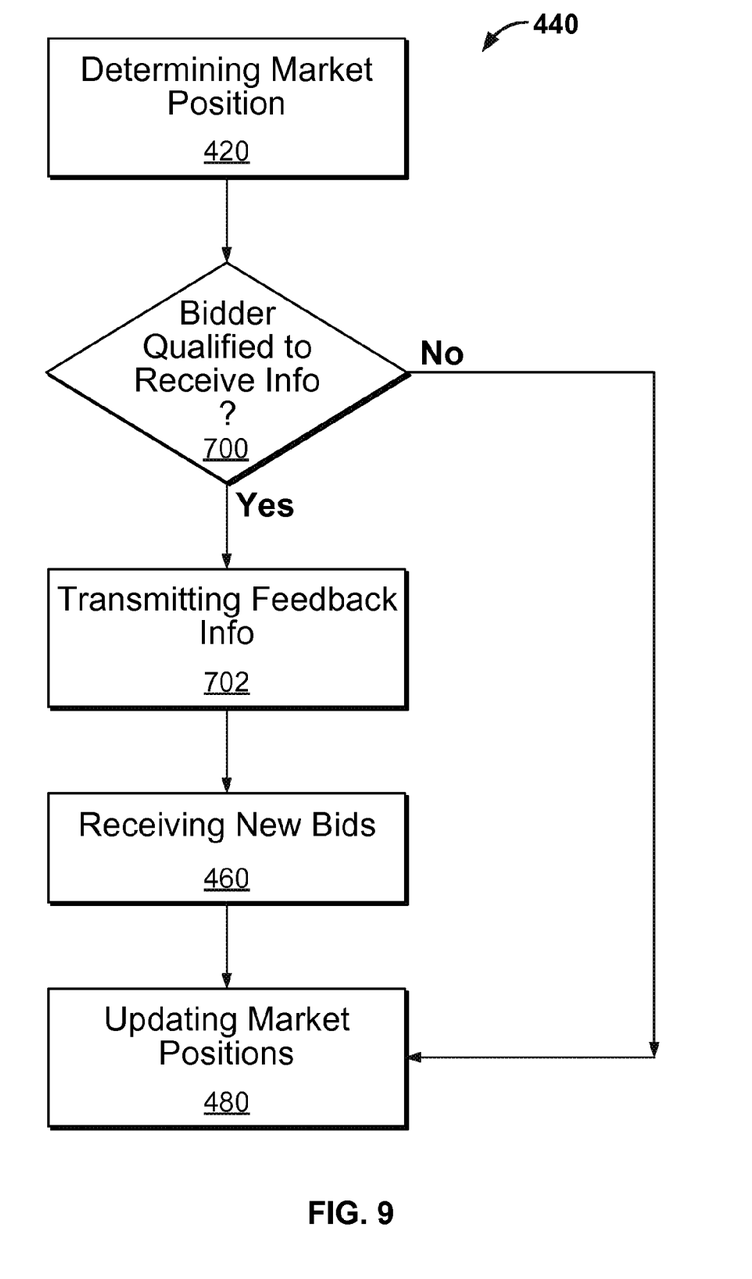
FIG. 9 a flow diagram of the "DISPLAYING FEEDBACK INFORMATION" step of FIG. 4 in greater detail.

Referring again to FIG. 4, the market position containing a dynamic reserve price and/or respective ranking information is displayed to bidders 30 in step 440. The present invention effectively promotes competitive bidding in an auction by allowing suppliers to know, at all times throughout the bidding process, where they need to bid in order to truly be considered for an award of a contract. In one embodiment, feedback information containing the market position is shown only to the selected bidder(s). As shown in FIG. 9, which shows step 440 of FIG. 4 in greater detail, the process of selectively displaying feedback information begins after determining market position in step 420. In step 700, at least one of several criteria is applied to determine whether a particular bidder 30 is qualified to receive the feedback information. Note that no information is transmitted when no bidder qualifies to receive the feedback information.

In accordance with the present invention, the feedback information may be shown only to those bidders 30 who have submitted at least one valid bid. Alternatively or additionally, the feedback information may be shown only to a bidder who meets at least one of the following conditions: whether a bidder is an incumbent bidder, whether a bidder is the leading bidder, whether a bidder has entered the bid within a predetermined time period, whether the bidder's bid has met or surpassed the bid of the incumbent bidder, whether the bidder's bid has surpassed a predetermined amount, and whether the bid of an incumbent bidder is placed below the historic or original reserve line.

Figure 10:
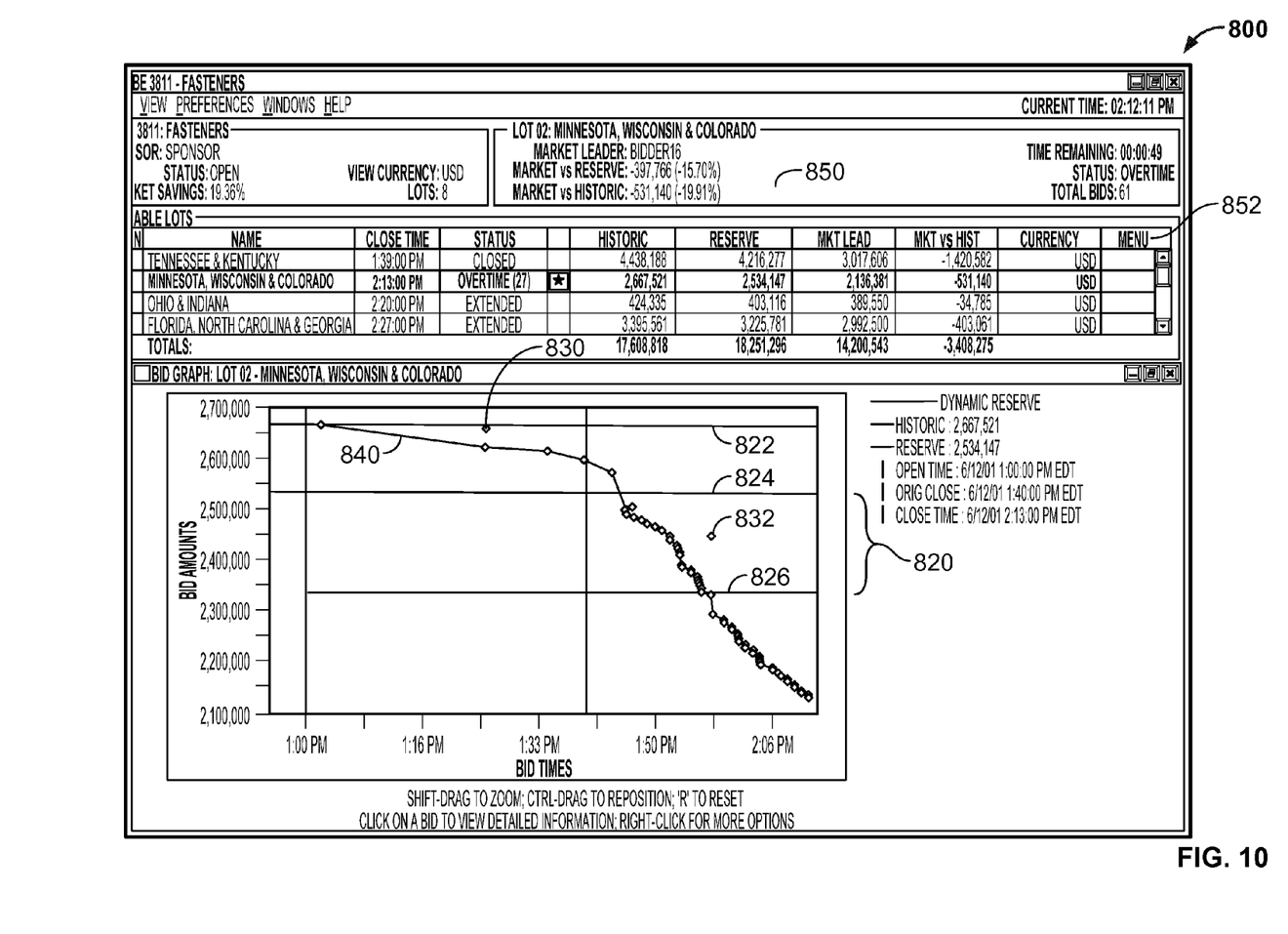
FIG. 10 illustrates an exemplary graphical user interface display.

Once it is determined that the bidder qualifies to receive the feedback information in step 700, the information is transmitted over the network, such as the Internet 40, to the qualifying or selected bidder in step 702. One embodiment showing a system used for transmitting the feedback information is shown in FIG. 10. As shown, the feedback information is displayed in a graphical user interface 800. The graphical user interface 800 is used by a bidder 30 to both receive the feedback information and send a new bid, if any, to computer system 50 over the Internet 40. As shown, the graphical user interface 800 includes a lower region 820 showing a graphical representation of bidding progress. Note that this is comparable to the graphs shown in FIGS. 7A and 7B. Thus, line 822 indicates a reserve price line, which was initially set to equal the dynamic reserve price line. After an incumbent places its first bid 830 below line 822, the dynamic reserve line shifts to line 824, indicating a new price level which a non-incumbent bidder must surpass to receive an award of a contract from the sponsor 10. When the incumbent bidder places its second bid 832 below line 824, the dynamic reserve price again shifts to line 826 to reflect the change. Now all non-incumbent bidders must surpass line 826 in order to win an award of contract. Of course, for the incumbent bidder, the threshold of winning a contract remains at line 822, assuming that no one has bid below line 826 (or otherwise has surpassed the dynamic reserve price). Note that line 840 shows a series of bids placed by other non-incumbent bidders, indicating non-incumbent bidder's adjustment in light of the dynamic reserve price line and its movements.

The graphical user interface 800 also includes an upper region 850 showing a textual representation of bidding progress. The information represented graphically in the lower region 820 is represented textually and numerically in the upper region 850. For instance, using the "menu" tab 852 located in the upper region 850, bidders 30 can see in real time their position in relation to the dynamic reserve price line. Also using the tab 852, a bidder 30 can see its respective ranking in relation to the leading bidder, to all other bidders, and to the incumbent bidder. Referring again to FIG. 9, the selected bidder 30 may send in a new bid, which is received by computer system 50 in step 460. The new bid is used to update the market position in step 480. Bidders 30 may use the graphical user interface 800 to submit new bids, if any, which are used to update the market position for the bidders 30.

While the invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents.

What is claimed is:

1. A method of promoting competitive bidding in an online auction having a non-favored bidder, a favored bidder, and a sponsor, said method comprising:
   receiving a first bid from said non-favored bidder;
   receiving a second bid from said favored bidder;
   determining by a processor, a market position for said non-favored bidder in relation to said favored bidder, at least in part by determining a relative spread using the second bid;
   displaying feedback information to at least one of said non-favored bidder and said favored bidder, said feedback information comprising said market position;
   receiving a third bid from at least one of the non-favored and favored bidder; and
   updating the market position for at least one of said non-favored bidder and said favored bidder using the received third bid.

2. The method of claim 1, further comprising:
   selecting a winning bidder from said non-favored bidder and said favored bidder based on said market position.

3. The method of claim 2, further comprising:
   awarding said contract to said winning bidder.

4. The method of claim 1, wherein said non-favored bidder is included in a plurality of non-favored bidders and said displaying comprises:
   deciding whether at least one of said favored bidder and at least one of said non-favored bidders qualify to receive said feedback information; and
   transmitting said feedback information to at least one of said favored bidder and at least one of said non-favored bidders if at least one of said favored bidder and at least one of said non-favored bidders qualify.

5. The method of claim 4, wherein said deciding comprises:
   determining at least one of: whether at least one of said non-favored bidders places at least one bid, whether at least one of said non-favored bidders is leading, whether at least one of said non-favored bidders enters said bid within a predetermined time period, whether said bid of at least one of said non-favored bidders meets said bid of said favored bidder, whether said bid of at least one of said non-favored bidders surpasses at least one of said bid of said favored bidder by a predetermined amount, and whether said bid of said favored bidder is less than a reserve price.

6. The method of claim 1, wherein said non-favored bidder is included in a plurality of non-favored bidders and further comprising:
   determining, for each bidder in the plurality of non-favored bidders a relative score;
   assigning a rank to each of said non-favored bidders and said favored bidder based on said relative score; and
   designating said market position for each of said non-favored bidders and said favored bidder based on said rank.

7. The method of claim 1, wherein said determining a market position comprises designating said bid of said favored bidder as said relative score of said favored bidder.

8. The method of claim 1, wherein said displaying comprises showing said market position in at least one of a textual representation and a graphical representation.

9. A machine readable storage medium for promoting competitive bidding in an online auction having a non-favored bidder, a favored bidder, and a sponsor, said machine readable medium comprising computer instructions for:

receiving a first bid from said non-favored bidder;
receiving a second bid from said favored bidder;
determining a market position for said non-favored bidder in relation to said favored bidder, at least in part by determining a relative spread using the second bid;
displaying feedback information to at least one of said bidder and said favored bidder and, said feedback information comprising said market position;
receiving a third bid from at least one of the non-favored and favored bidder; and
updating the market position for at least one of said non-favored bidder and said favored bidder using the received third bid.

10. The machine readable medium of claim 9, further comprising instructions for:
selecting a winning bidder from said non-favored bidder and said favored bidder based on said market position.

11. The machine readable medium of claim 10, further comprising instructions for awarding said contract to said winning bidder.

12. A system for promoting competitive bidding in an online auction having a non-favored bidder, a favored bidder, and a sponsor, said system comprising:
at least one processor configured to:
receive a first bid from said non-favored bidder;
receive a second bid from said favored bidder;
determine a market position for said non-favored bidder in relation to said favored bidder, at least in part by determining a relative spread using the second bid;
display feedback information to at least one of said non-favored bidder and said favored bidder, said feedback information comprising said market position;
receive a third bid from at least one of the non-favored and favored bidder; and
update the market position for at least one of said non-favored bidder and said favored bidder using the received third bid.

13. A computer system operatively connected to a network comprising:
means for receiving a first bid from a non-favored bidder and a second bid from a favored bidder over said network;
means for determining a market position for said non-favored bidder in relation to said favored bidder, at least in part by determining a relative spread using the second bid;
means for transmitting feedback information, said feedback information comprising said market position and at least one of a textual representation and a graphical representation;
means for receiving a third bid from at least one of the non-favored and favored bidder; and
means for updating the market position for at least one of said non-favored bidder and said favored bidder using the received third bid.

14. The computer system of claim 13, wherein said feedback information comprises a respective rank of said non-favored bidder in relation to said favored bidder.

15. The computer system of claim 13, wherein said feedback information comprises a reserve price, said reserve price representing a minimum price at which said sponsor is willing to award a contract.

16. The computer system of claim 13, wherein said feedback information comprises a dynamic reserve price, said dynamic reserve price representing a price at which said sponsor is willing to award a contract to said bidder other then said favored bidder.

17. The computer system of claim 13, further comprising:
means for receiving a new bid from said bidder and said favored bidder; and
means for updating said market position based on said new bid.

18. The machine readable medium of claim 9, wherein said non-favored bidder is included in a plurality of non-favored bidders and said displaying comprises:
deciding whether at least one of said favored bidder and at least one of said non-favored bidders qualify to receive said feedback information; and
transmitting said feedback information to at least one of said favored bidder and at least one of said non-favored bidders if at least one of said favored bidder and at least one of said non-favored bidders qualify.

19. The machine readable medium of claim 18, wherein said deciding comprises:
determining at least one of: whether at least one of said non-favored bidders places at least one bid, whether at least one of said non-favored bidders is leading, whether at least one of said non-favored bidders enters said bid within a predetermined time period, whether said bid of at least of said non-favored bidders meets said bid of said favored bidder, whether said bid of at least one of said non-favored bidders surpasses at least one of said bid of said favored bidder and a predetermined amount, and whether said bid of said favored bidder is less than a reserve price.

20. The machine readable medium of claim 9, wherein said non-favored bidder is included in a plurality of non-favored bidders and further comprising:
determining, for each bidder in the plurality of non-favored bidders a relative score;
assigning a rank to each of said non-favored bidders and said favored bidder based on said relative score; and
designating said market position for each of said non-favored bidders and said favored bidder based on said rank.

21. The machine readable medium of claim 9, wherein said determining a market position comprises designating said bid of said favored bidder as said relative score of said favored bidder.

22. The machine readable medium of claim 9, wherein said displaying comprises showing said market position in at least one of a textual representation and a graphical representation.

* * * * *